Aug. 6, 1929.   A. DOM   1,723,969
GROUND VASE
Filed Aug. 8, 1928   2 Sheets-Sheet 1
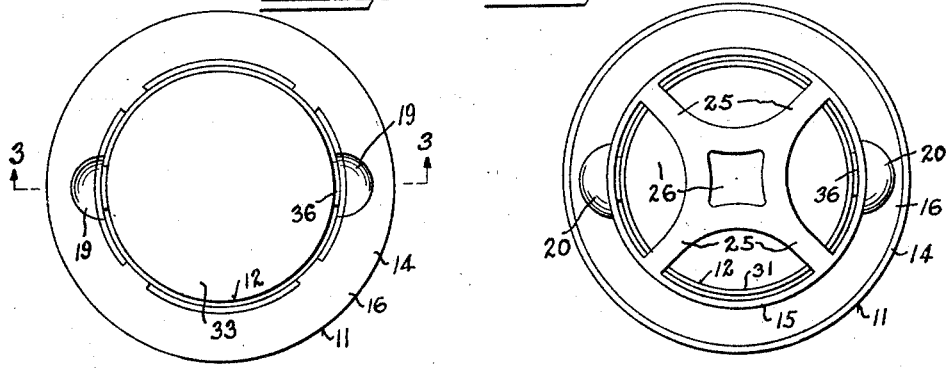
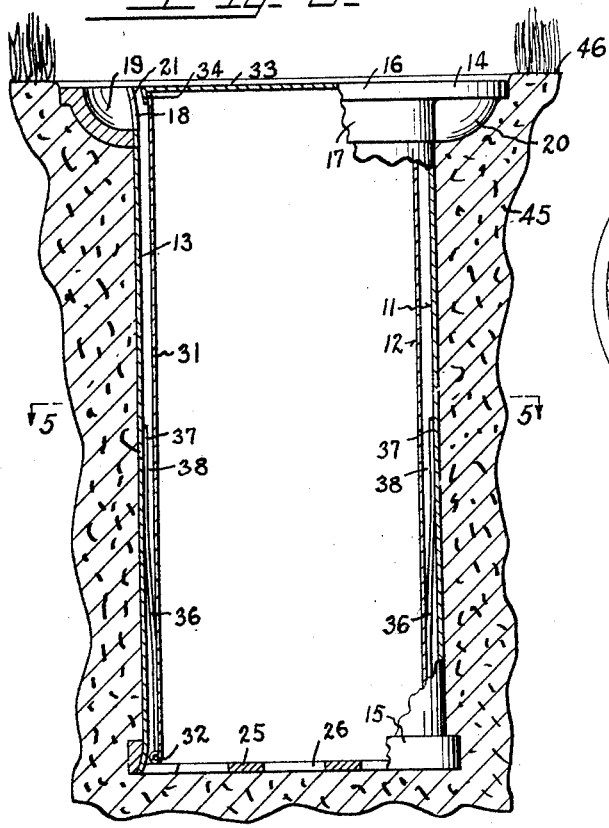
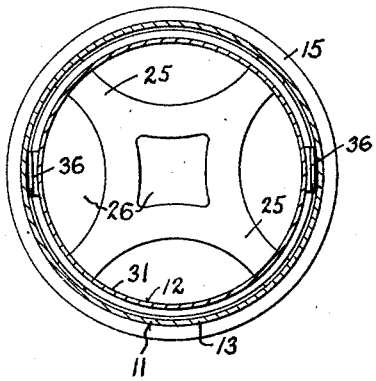
INVENTOR:
Alexander Dom,
by B. H. Herbold,
His Attorney.

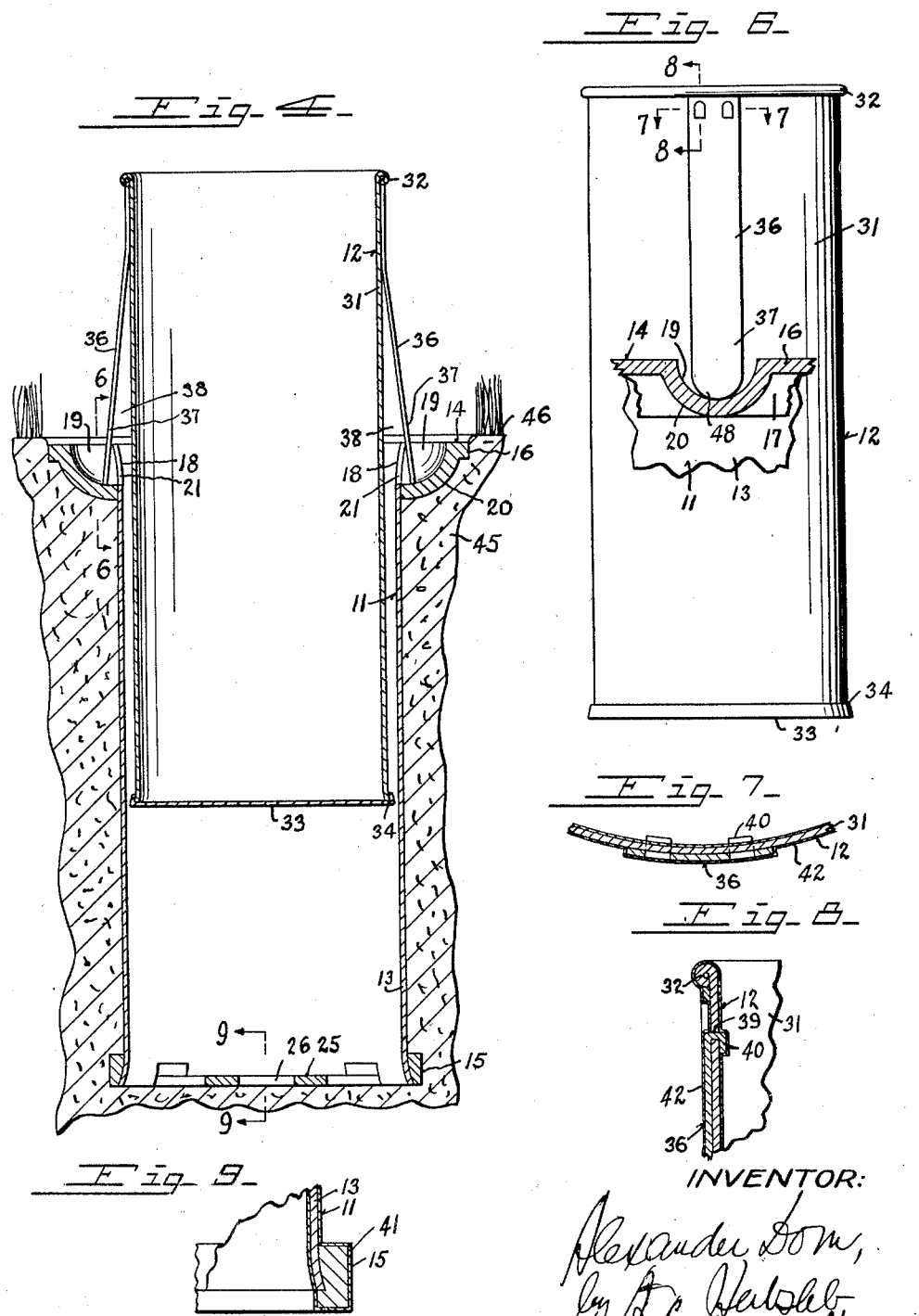

Patented Aug. 6, 1929.

1,723,969

UNITED STATES PATENT OFFICE.

ALEXANDER DOM, OF CINCINNATI, OHIO, ASSIGNOR TO JOHN D. BERGER, OF CINCINNATI, OHIO.

GROUND VASE.

Application filed August 8, 1928. Serial No. 298,160.

My invention relates to vases arranged to be sunk in the ground, for instance, on lawns, in cemeteries, or other places, in which it is desired to locate cut flowers or the like.

My invention is an improvement on the ground vase shown, described and claimed in United States Letters Patent No. 1,616,-647, granted John D. Berger, February 8, 1927, for ground vase.

It is the object of my invention to provide a ground vase of the character mentioned which may be sunk into the ground so that its top is flush with or below the surface of the ground, so as to be in unobstructed relation with a lawn mower or other garden trimming tool which may be passed over the ground, and which is provided with an inner receptacle in which the cut flowers or the like are arranged to be received, and which is arranged to be received in an outer receptacle, and is provided with side wings so arranged as to center the inner receptacle in the outer receptacle, with either end of the inner receptacle presented downwardly, so that the upper end of the inner receptacle in either position or relation is in unobstructed relation with the level of the ground, and so that the side wings may be supported by the upper portion of the outer receptacle, with the inner receptacle projecting above the ground with its open-ended top projected upwardly for displaying the cut flowers or the like in said inner receptacle.

The invention will be further readily understood from the following description and claims, and from the drawings, in which latter:

Fig. 1 is a plan view of my improved device, with the inner receptacle shown bottom up.

Fig. 2 is a bottom view of the same.

Fig. 3 is an axial section of the same, taken on the line 3—3 of Fig. 1, my improved device being shown partly in side elevation and partly broken away.

Fig. 4 is an axial section of the same, taken on a line similar to the line 3—3 of Fig. 1, showing the inner receptacle with its open end up and extending above the outer casing.

Fig. 5 is a cross-section of the same, taken in the plane of the line 5—5 of Fig. 3.

Fig. 6 is a side elevation of the inner receptacle and part of the outer receptacle in section in the plane of the line 6—6 of Fig. 4.

Fig. 7 is a cross-section of the same, taken on the line 7—7 of Fig. 6.

Fig. 8 is a longitudinal section of a detail of my improved device, taken in the plane of the line 8—8 of Fig. 6; and, Fig. 9 is a longitudinal section of a detail of the outer casing, taken on the line 9—9 of Fig. 4.

My improved device comprises an outer casing 11 and an inner receptacle 12. The outer casing comprises a tubular wall 13, at the upper end of which there is a flange-ring 14, and at the lower end of which there is a flange-ring 15.

The flange-ring 14 is preferably a metal casting comprising a laterally extending annular flange 16 and a depending annular flange 17. The upper end of the tubular wall 13 is secured to the flange-ring 14, and preferably has an outwardly flaring annular portion 18, for instance as more fully described in the aforesaid patent.

The flange-ring 14 is provided with recesses 19 which extend inwardly at the opposite sides of the flange-ring, forming outward bulge 20 at the bottom of said flange-ring for strengthening the flanges thereof. The upper end of the tubular wall is provided with recesses 21, which register with the recesses 19 when the flange-ring 14 and tubular wall are assembled.

A spider-structure at the bottom of the tubular wall comprises the flange-ring 15 between which cross-bars 25 extend, forming an integral structure, preferably a metal casting. There are openings 26 between the cross-bars so as to provide a perforate bottom for the casing, which serves as a support for the inner receptacle. The lower end of the tubular wall 13 is secured to the flange-ring 15, for instance as shown and described in the aforesaid patent.

The inner receptacle comprises a tubular wall 31, which may be formed of sheet metal into tubular form. The upper end of the tubular wall is provided with an outwardly extending bead 32. The inner receptacle is provided with a closed bottom 33, which is close connected with the lower end of the inner tubular wall by an outwardly extending joint 34, which forms a bead at the bottom of the inner receptacle. These beads form handy gripping means for the fingers when letting the inner receptacle into the casing and removing the same therefrom, whether the open end or the closed end of the inner receptacle is uppermost. The thumb and forefinger are readily received in the recesses 19, 21, for readily grasping the bead on the inner receptacle which may be uppermost.

Side wings 36 extend from the end of the inner receptacle along the length of the outer periphery of the inner receptacle. These side wings have free ends 37 which are spaced by spaces 38 from the tubular wall of the inner receptacle. These side wings are preferably of spring material and normally extend resiliently at their free ends outwardly away from the inner receptacle for a greater distance than the diameter of the inner periphery of the tubular wall 13 at the flange-ring 14.

The outer ends of the wings are preferably fixed to the end of the inner receptacle. Thus the inner receptacle at its open end is provided with holes 39. Fingers 40 are struck up from the body of the side wings and are received in said holes from the outside of said inner receptacle and are bent upon the inner face of the tubular wall 31 for securely clamping the side wings to said tubular wall.

After the outer casing and the inner receptacle have been respectively formed up and assembled they are respectively provided with heavy metal galvanized coatings 41, 42, throughout all their respective surfaces for covering all of the parts of the same and firmly securing all of the joints and parts together, and for preventing oxidation or rust.

The inner receptacle forms a vase receptacle for holding the water and flowers when its open end is upward in the outer casing, and the bottom of the inner receptacle closes the outer casing when the inner receptacle is in the outer casing in inverted position. The inner receptacle is arranged to be located with its closed bottom adjacent to the open bottom of the outer casing, or the inner receptacle may be supported in upwardly extending relation so as to project to material extent out of the outer casing, for raising the same above the ground and raising the cut flowers which are therein for making the latter more prominent.

The outer casing is sunk into the ground 45 with the upper face of the upper flange 16 flush with or preferably slightly below the surface 46 of the ground. The earth is packed about the outer periphery of the casing and is located above the lower flange 15 of the casing, which flange resists the tendency of frost and thawing to raise the receptacle out of the ground, thereby maintaining the receptacle with its upper face at the level of or below the level of the ground.

The inner receptacle is arranged to be received in the casing with its open end up or its closed bottom end up. When the vase is not in use, the inner receptacle is put into the casing with its bottom up, as shown in Fig. 3, the inner receptacle being centered in the outer receptacle by means of the spring side wings 36. This prevents foreign substances from accumulating within the casing and receptacle, and water will readily drain between the sides of the inner receptacle and the casing and through the openings 26 in the bottom of the casing.

When it is desired to use my improved device for cut flowers and the like, the inner receptacle is inserted in the outer casing with its open end up, the lower ends of the side wings forming supports and preferably being received in the recesses 19, the lower ends of the side wings being preferably rounded, as at 48, to fit the rounded bottoms of said recesses. In this manner the inner receptacle is securely positioned on the outer casing, and extends above the top of the outer casing for holding the cut flowers or the like in raised relation for better view of the same.

The outer walls of the recesses 19 slope downwardly and inwardly. The ends of the side wings rest on these sloping walls and center the inner receptacle with relation to the outer casing, due to said outer ends of the side wings sliding downwardly by gravity along said sloping walls.

The side wings may also be pressed inwardly for being received within the tubular wall of the outer casing, the inner receptacle being allowed to slide downwardly so that its bottom is supported by the perforate bottom of the outer casing, when it is desired to locate the cut flowers or the like in the inner receptacle in lower position.

Having thus fully described my invention, what I claim as new, and desire to secure by Letters Patent, is:

1. A ground vase comprising an outer casing including a tubular wall and an inner receptacle including a tubular wall having an open top and a closed bottom, and side wings secured to said inner receptacle and extending lengthwise of the outer periphery of said last-named tubular wall and having supports intermediate of the ends of said last-named tubular wall, and said supports arranged to be supported by the upper portion of said outer casing with said bottom of said inner receptacle located at an intermediate position in the length of said first-named tubular wall and said open end raised above said casing.

2. A ground vase comprising an outer casing including a tubular wall, a flange-ring at the upper end of said tubular wall, said flange-ring and said upper end of said tubular wall provided with registering inwardly opening recesses, and a perforate bottom arranged for passage of water therethrough into the ground in which said ground vase is arranged to be sunk, an inner receptacle including a tubular wall and having an open top end and a closed bottom, and side wings secured to said last-named tubular wall at said open top end and extending lengthwise of the outer periphery of said last-named tubular wall, said side wings having ends intermediate of the ends of said last-named tubular wall spaced from said last-named tubular wall, said side wings arranged to press against the inner periphery of said first-named tubular wall for centering said inner receptacle in said outer casing when said inner receptacle is in reverse positions with its respective ends supported by said perforate bottom, and the end of said inner receptacle which is the upper end when so supported located in registry with said inwardly opening recesses, and said ends of said side wings arranged to be received in said inwardly opening recesses, with said bottom of said inner receptacle located at an intermediate position in the length of said first-named tubular wall and said open end raised above said casing.

In testimony whereof, I have hereunto signed my name.

ALEXANDER DOM.